United States Patent Office 2,871,263
Patented Jan. 27, 1959

2,871,263

PHOSPHONIC DIHALIDES

James N. Short, Borger, Tex., assignor to Phillips Petroleum Company, a corporation of Delaware No Drawing. Application April 26, 1954
Serial No. 425,769

6 Claims. (Cl. 260—543)

This invention relates to phosphonic dihalides. In one aspect, this invention relates to haloalkenephosphonic dihalides as new compounds. In another aspect, this invention relates to the preparation of haloalkenephosphonic dihalides. In another aspect, this invention relates to haloalkenephosphonic dihalides having a halogen atom attached to a carbon atom beta to the phosphorus atom. In another aspect, this invention relates to new chemical compounds represented by the structural formulas given and defined below. In still another aspect, this invention relates to polymers of phosphonic dihalides.

According to the invention there is provided as a new compound a phosphonic dihalide characterized by the structural formula

where R is a monovalent hydrocarbon radical containing at least one olefinic double bond and having at least one halogen atom attached to a carbon atom therein, and where X is a halogen atom.

Representative of the new compounds provided by the invention are the phosphonic dihalides, represented by the formulas:

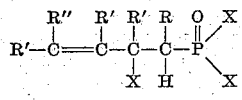   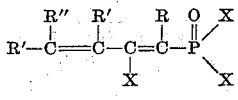

I                          II

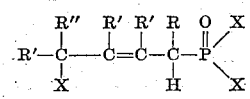   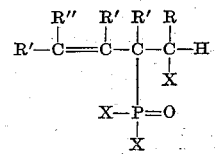

III                        IV and

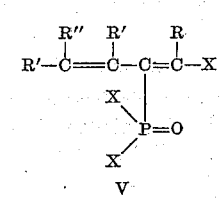

V where R is hydrogen, R' and R" are members of a group consisting of hydrogen, halogen, alkyl, cycloalkyl, aralkyl, alkaryl, aryl, alkenyl, cycloalkenyl, aralkenyl, and alkenylaryl radicals, where R and R" together with the four carbon atoms can be members of a five- or six-membered carbocyclic ring, where the sum of all the carbon atoms in R, R', and R" does not exceed ten carbon atoms, and where X is either Cl or Br.

Thus, while phosphonic halides have been prepared in the prior art, haloalkenephosphonic dihalides and particularly haloalkenephosphonic dihalides having a halogen atom attached to a carbon atom beta to the phosphorus atom, have not been known to the prior art.

Included in the group of compounds represented by the above formulas are 2-chloro-3-butene-1-phosphonic dichloride, 2-chloro-1,3-butadiene-1-phosphonic dichloride, 2-chloro-2,3-dimethyl-3-butene-1-phosphonic dichloride, 2-chloro-4-phenyl-3-butene-1-phosphonic dichloride, 2-bromo-3-cyclohexene-1-phosphonic dibromide, 2,3-dichloro-3-butene-1-phosphonic dichloride, 4-chloro-2-butene-1-phosphonic dichloride, 4-chloro-2,3-dimethyl-2-butene-1-phosphonic dichloride, 4-bromo-2-cyclohexene-1-phosphonic dibromide, 4-chloro-2-cyclopentene-1-phosphonic dichloride, 3,4-dichloro-2-butenephosphonic dichloride, 1-chloro-3-butene-2-phosphonic dichloride, 1-chloro-2,3-dimethyl-3-butene-2-phosphonic dichloride, 1-chloro-4-phenyl-3-butene-2-phosphonic dichloride, 1-chloro-4-benzyl-3-butene-2-phosphonic dichloride, 1-chloro-4-tolyl-3-butene-2-phosphonic dichloride, 1-bromo-3-cyclohexene-2-phosphonic dibromide, 1-chloro-3-cyclopentene-2-phosphonic dichloride, 1,3-dichloro-3-butene-2-phosphonic dichloride, 1-chloro-1,3-butadiene-2-phosphonic dichloride, 2-chloro-4-benzyl-3-butene-1-phosphonic dichloride, 2-chloro-4-tolyl-3-butene-1-phosphonic dichloride, 2-chloro-3-cyclopentene-1-phosphonic dichloride, 1-chloro-3,7-tetradecadiene-2-phosphonic dichloride, 2-chloro-3,7-tetradecadiene-1-phosphonic dichloride, 1-chloro-8-phenyl-3,7-octadiene-2-phosphonic dichloride 2-chloro-8-phenyl-3,7-octadiene-1-phosphonic dichloride, 1-bromo-3-methyl-4-(p-propenylphenyl)-3-butene-2-phosphonic dibromide, 2-bromo-3-methyl-4-(p-propenylphenyl)-3-butene-1-phosphonic dibromide, 1-chloro-6-(1,4-cyclohexadienyl)-3-hexene-2-phosphonic dichloride, 2-chloro-6-(1,4-cyclohexadienyl)-3-hexene-1-phosphonic dichloride, 2-chloro-3-hexene-1-phosphonic dichloride, 1-chloro-3-hexene-2-phosphonic dichloride, 2-bromo-3-tetradecene-1-phosphonic dibromide, 2-bromo-4-(p-tert-butylphenyl)-3-butene-1-phosphonic dibromide, 2-chloro-4-(4-tert-butylcyclohexyl)-3-butene-1-phosphonic dichloride, 2-chloro-6-(p-ethylphenyl)-3-hexene-1-phosphonic dichloride, 1-bromo-3-tetradecene-2-phosphonic dibromide, 1-bromo-4-(p-tert-butylphenyl)3-butene-2-phosphonic dibromide, 1-chloro-4-(4-tert-butylcyclohexyl)-3-butene-2-phosphonic dichloride, 1-chloro-6-(p-ethylphenyl)-3-hexene-2-phosphonic dichloride, 2-chloro-1,3-tetradecadiene-1-phosphonic dichloride, 1-chloro-1,3-tetradecadiene-2-phosphonic dichloride, 2-bromo-6-phenyl-1,3-hexadiene-1-phosphonic dibromide, and 1-bromo-6-phenyl-1,3-hexadiene-2-phosphonic dibromide.

Further, according to the invention, there are provided new compositions of matter comprising polymers of the novel phosphonic dihalides.

Still further according to the invention, there is provided a method of preparing the new phosphonic dihalides.

A preferred method of preparing this new class of phosphonic dihalides is by reacting under anhydrous conditions a haloalkenephosphorus tetrahalide with substantially an equivalent amount of an organic carboxylic acid. For example, 2-chloro-3-butene-1-phosphonic dichloride can be prepared according to the following equation:

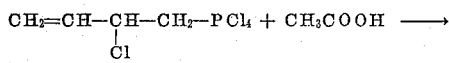

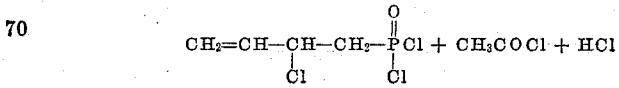

The carboxylic acid is added to a cooled solution or slurry of the haloalkene-phosphorus tetrahalide in an inert solvent, such as benzene. The above reaction is exothermic in nature. Therefore, if the reaction temperature is to be maintained in the preferred range of 0 to 40° C., it is necessary to provide adequate cooling means or add the reactants at a sufficiently slow rate so that the heat can be dissipated to the surroundings. Usually it is preferred to add the acid to the cooled solution or slurry of the tetrahalide and keep the reaction vessel surrounded by a cooling medium such as an ice bath. A slight vacuum is applied to facilitate the removal of hydrogen halide which is evolved. On completion of the reaction, the ice bath is removed, and the inert solvent is removed by evaporation under diminished pressure at room temperature. The haloalkenephosphonic dihalide is separated from the residual reaction mixture by fractional distillation under reduced pressure. While anhydrous conditions are preferred less than anhydrous conditions can be employed. Water reacts with the product with resulting lower yield. Normal precautions to exclude water are observed.

Haloalkenephosphorus tetrahalides from which the products of our invention can be prepared are preferably obtained by reacting under anhydrous conditions phosphorus pentahalide with a slight excess of a conjugated olefin or cycloolefin containing at least two double bonds, a conjugated alkenyne, or a halogen derivative of such a hydrocarbon. Suitable compounds include 1,3-butadiene, 2,3 - dimethyl - 1,3 - butadiene, 1 - phenyl - 1,3 - butadiene, 1,3 - cyclohexadiene, 1,3 - cyclopentadiene, 1- tolyl - 1,3 - butadiene, 5 - phenyl - 1,3 - pentadiene, 1-buten - 3 - yne, 2 - chloro - 1,3 - butadiene; 1,3,7 - tetradecatriene, 1-phenyl-1,5,7-octatriene, 2-methyl-1-(p-propenylphenyl) - 1,3 - butadiene, 1 - (1,4 - cyclohexadienyl)-3,5-hexadiene, 1,3-hexadiene, 1,3-tetradecadiene, 1 - ( - p - tert - butylphenyl) - 1,3 - butadiene, 1 - (4- tert - butylcyclohexyl) - 1,3 - butadiene, 1 - (4 - ethylcyclohexyl) - 3,5 - hexadiene, 3 - tetradecen - 1 - yne, and 1-phenyl-3-hexen-5-yne. For example, when the starting materials are 1,3-butadiene and phosphorus pentachloride, the reaction proceeds according to the following equations. Three possible isomers can be obtained.

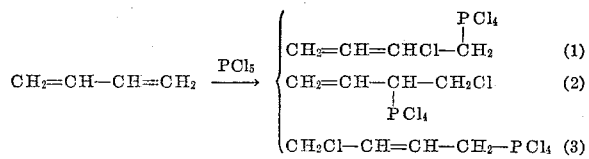

When these phosphorus tetrachlorides are reacted with an organic carboxylic acid according to the invention, the corresponding haloalkenephosphonic dichlorides are obtained as follows:

(4)
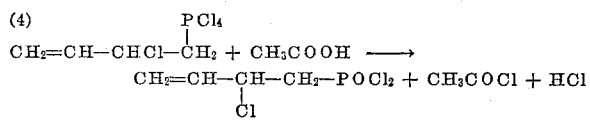

(5)
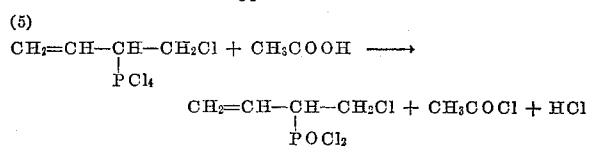

(6) CH₂Cl—CH=CH—CH₂PCl₄+CH₃COOH→
CH₂Cl—CH=CH—CH₂POCl₂+CH₃COCl+HCl

The above equations are given in what is believed to be the probable order of their preponderance.

It is believed at present that Equations 1 and 4 above are more likely and, therefore, the product obtained therein is the most likely product of the invention. However, the products obtained in Equations 5 and 6 above are within the scope of the invention.

When the starting material is vinylacetylene, the phosphorus pentachloride adds to the two carbon atoms joined by a triple bond, to give the two isomers shown in the following equations:

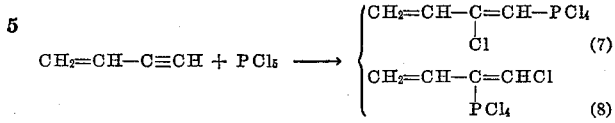

When the phosphorus tetrachlorides of Equations 7 and 8 are reacted with an organic carboxylic acid according to the invention, the corresponding haloalkenephosphonic dichlorides are obtained as follows:

(9)
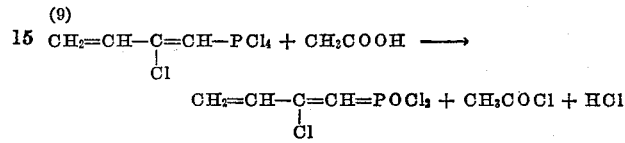

(10)
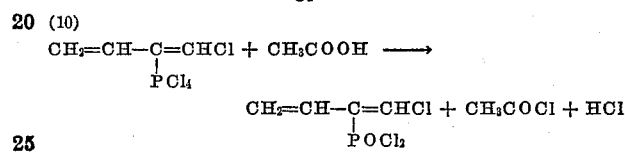

It is believed at present that Equations 7 and 9 above are more likely and, therefore, the product obtained therein is the most likely product of the invention when the starting material is vinylacetylene.

Example I

The isomeric chlorobutenephosphonic dichlorides were prepared by the following procedure:

To a suspension of 454 g. of phosphorus pentachloride in 1200 cc. of dried benzene was added, with constant stirring, 250 g. of butadiene. After standing at 15–20° C. overnight, 100 cc. (about 60 g.) of butadiene was added to replace any butadiene that might have evaporated, and the suspension was stirred for 8 hours. The next day, an additional 100 cc. of butadiene was added, and the suspension was stirred for two hours. After cooling the flask in an ice bath, 2.2 mols of glacial acetic acid was added, while stripping off HCl, acetyl chloride, and some of the benzene in vacuo. The remainder of the solvent was then removed in vacuo from the resulting solution, and the residue distilled to yield 130 g. (33 percent) of chlorobutenephosphonic dichloride which boiled at 106° C. at 1.0 mm. Hg. The chlorobutenephosphonic dichloride had the following characteristics; refractive index of 1.5185 at 25° under white light; density of 1.436 at room temperature; and molecular refractivity: calculated, 42.05; found, 43.85.

A sample prepared by a procedure similar to the one described above had a chlorine content of 50.4 percent, as compared with a calculated value of 51.2 percent.

Example II

A second run was made for the purpose of preparing additional isomeric chlorobutenephosphonic dichlorides. 453 g. (2.17 mol) of PCl₅ was dissolved in 1500 cc. of vigorously refluxing benzene contained in a 3-liter, 3-necked flask which was equipped with a reflux condenser and dropping funnel. The solution was packed in ice, and cooled to below 40° C. 136 g. (2.52 mol) of butadiene dissolved in 300 cc. of benzene was then added over a 25 minute period. The material, packed in ice, was then stirred for 7 hours and allowed to stand overnight. To the pasty reaction mass was added dropwise, with constant stirring, 131 g. (2.18 mol) of acetic acid. The thick mixture turned clear, pale yellow. It was stripped with stirring to 25 C. at 20 mm. A dark tan oil, weighing 289.7 g. (64.4 percent theoretical) resulted. From 286.9 g. of this crude material was obtained 184.5 g. (41.5 percent theoretical) of a fraction boiling at 97–112° C. at 0.4 to 2.0 mm. Hg. It had a refractive index of $n_D^{25}$ 1.5186.

Alternative to acetic acid, other carboxylic acids can be used, for example, oxalic acid or benzoic acid.

As solvents which can be employed, alternative to benzene, are the hydrocarbons, especially the aromatic hydrocarbons such as toluene and xylene. Any solvent which is inert toward the reactants and product under the reaction conditions can be employed. The solvent should be easily separable from the reacted mass. The solvent should be stable under the conditions of separation from the reacted mass. The solvent should be stable under the conditions of separation from the reacted mass. The aromatic hydrocarbons such as benzene, toluene and xylene possess all these characteristics and are, therefore, my preferred solvents.

I prefer to carry out the reaction at low temperatures. When employing benzene as a solvent the reaction can be carried out at temperatures ranging from 0° to 40° C. It is preferable to carry out the reaction at temperatures ranging from 0° to 25° C. and still more preferable at temperatures ranging from 0° to 15° C. It should be noted that the preferred temperature range includes substantially atmospheric temperature. Temperatures outside the preferred range can be employed but below this range the reaction rate decreases and above this range excessive decomposition or chlorination of the desired product may occur.

Alternative methods for the preparation of phosphonic dichlorides from the phosphorus tetrachlorides are (1) by controlled hydrolysis with water and (2) by reaction with sulfur dioxide. These reactions can be represented by the following equations:

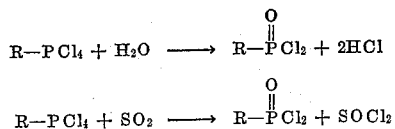

However, reaction (1) is difficult to control because the product is also capable of undergoing hydrolysis although less readily than the starting material. The reaction (2) works very well with saturated compounds but, in the case of butadiene and other unsaturated compounds, offers an opportunity for the $SO_2$ to add to the olefinic double bonds.

When the chlorobutenephosphonic dichlorides of the invention are distilled a small amount of polymer is formed. At present the nature of this polymer and its formation are unknown. However, it is evident that one method of preparing polymers from said compounds is by the application of heat. The butadienephonsphonic dichlorides are also capable of polymerization to form polymers.

The haloalkenephosphonic dihalides which are the product of this invention are valuable as plasticizers for various synthetic resins and synthetic rubber, as textile treating agents, and as monomers in the formation of polymers and copolymers. They are useful as intermediates for the production in pure form of the corresponding acids, esters, or amides; when treated with water, the phosphonic dihalides yield phosphonic acids; when treated with alcohols, phenols, mercaptans, or thiophenols, they yield phosphonates or thiophosphonates; when treated with ammonia or amines containing a hydrogen attached to the nitrogen atom, they yield phosphonic diamides. Said phosphonic diamides, and their preparation from said haloalkenephosphonic dihalides, are disclosed and claimed in my co-pending application Serial No. 425,770, filed April 26, 1954, now Patent No. 2,818,406.

In the specification and in the claims the term "haloalkenephosphonic" is used as a generic term to include compounds which contain one or more carbon to carbon double bonds.

Obviously, one reading the above specification will realize that the various phosphonic dihalides represented by the formulas given herein are not necessarily equivalents in the usual sense of that term but rather are alternatives each possessing different properties and, therefore, different uses.

Reasonable variation and modification are possible within the scope of the foregoing disclosure and the appended claims to the invention, the essence of which is: that new compounds represented by the structural formula

where R is a monovalent hydrocarbon radical containing at least one olefinic double bond and having at least one halogen atom attached to a carbon atom therein, and where X is a halogen atom, have been provided; said new compounds in some instances being haloalkenephosphonic dihalides having a halogen atom attached to a carbon atom beta to the phosphorus atom; and new compositions of matter comprising polymers of said phosphonic dihalides have been provided; and a method of preparing said phosphonic dihalides which comprises reacting an organic carboxylic acid with a haloalkenephosphorus tetrahalide.

I claim:

1. The method of preparing a mixture of isomeric haloalkenephosphonic dihalides wherein the halogen atoms are selected from the group consisting of chlorine and bromine which comprises reacting 1,3-butadiene with a phosphorus pentahalide to form a mixture of corresponding isomeric haloalkenephosphorus tetrahalides, reacting said tetrahalides at a temperature maintained within the range of 0 to 40° C. with a substantially equivalent quantity of an organic carboxylic acid to form said dihalides, and recovering said dihalides.

2. The method of preparing a mixture of isomeric chloroalkenephosphonic dichlorides which comprises, reacting 1,3-butadiene with phosphorous pentachloride to form a mixture of corresponding chloroalkene phosphorus tetrachlorides, reacting said tetrachlorides at a temperature maintained within the range of 0 to 40° C. with a substantially equivalent quantity of acetic acid to form said dichlorides, and recovering said dichlorides.

3. The method of preparing a mixture of isomeric haloalkenephosphonic dihalides wherein the halogen atoms are selected from the group consisting of chlorine and bromine, which method comprises, adding a substantially equivalent quantity of 1,3-butadiene to a solution of a phosphorus pentahalide in an inert solvent to form a first reaction mixture containing a mixture of corresponding isomeric haloalkenephosphorus tetrahalides, adding a substantially equivalent quantity of an organic carboxylic acid to said first reaction mixture to form a second reaction mixture, cooling said first reaction mixture during the addition of said acid so as to maintain the temperature thereof within the range of 0 to 40° C., and recovering said haloalkenephosphonic dihalides from said second reaction mixture.

4. The method of claim 3 wherein said phosphorus pentahalide is phosphorus pentachloride, said inert solvent is benzene, said organic carboxylic acid is acetic acid, and said temperature during the addition of said acid is maintained within the range of 0 to 15° C.

5. A mixture of isomeric chloroalkenephosphonic dichlorides prepared by: reacting 1,3-butadiene with phosphorus pentachloride to form a mixture of corresponding isomeric chloroalkenephosphonic tetrachlorides, reacting said tetrachlorides at a temperature maintained within the range of 0–40° C. with a substantially equivalent quantity of acetic acid to form said dichlorides, and recovering said dichlorides.

6. A mixture of isomeric haloalkenephosphonic dihalides wherein the halogen atoms are selected from the group consisting of chlorine and bromine, prepared by: reacting 1,3-butadiene with a phosphorus pentahalide to form a mixture of corresponding isomeric haloalkenephosphonic tetrahalides, reacting said tetrahalides at a temperature maintained within the range of 0–40° C. with a susbtantially equivalent quantity of an organic carboxylic acid to form said dihalides, and recovering said dihalides.

References Cited in the file of this patent

UNITED STATES PATENTS

| | | |
|---|---|---|
| 2,389,576 | Kosolapoff | Nov. 20, 1945 |
| 2,471,472 | Woodstock | May 31, 1949 |
| 2,670,367 | Lewis et al. | Feb. 23, 1954 |
| 2,683,168 | Jensen et al. | July 6, 1954 |

OTHER REFERENCES

Kosolapoff: Organo-phosphorus Compounds, pp. 61–2, 74 (1950).

UNITED STATES PATENT OFFICE
Certificate of Correction

Patent No. 2,871,263            January 27, 1959

James N. Short

It is hereby certified that error appears in the printed specification of the above numbered patent requiring correction and that the said Letters Patent should read as corrected below.

Column 3, line 45, for column 4, line 17, for

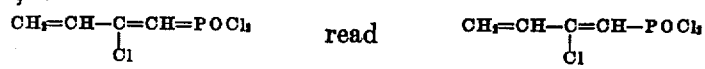

column 5, lines 12 and 13, strike out "The solvent should be stable under the conditions of separation from the reacted mass."; line 52, for "butadienephonsphonic" read —butadienephosphonic—.

Signed and sealed this 27th day of October 1959.

[SEAL]

Attest:
KARL H. AXLINE,
*Attesting Officer.*

ROBERT C. WATSON,
*Commissioner of Patents.*